F. H. BANBURY.
MACHINE FOR TREATING RUBBER AND OTHER HEAVY PLASTIC MATERIAL.
APPLICATION FILED APR. 20, 1917.
1,279,220.
Patented Sept. 17, 1918.
2 SHEETS—SHEET 1.
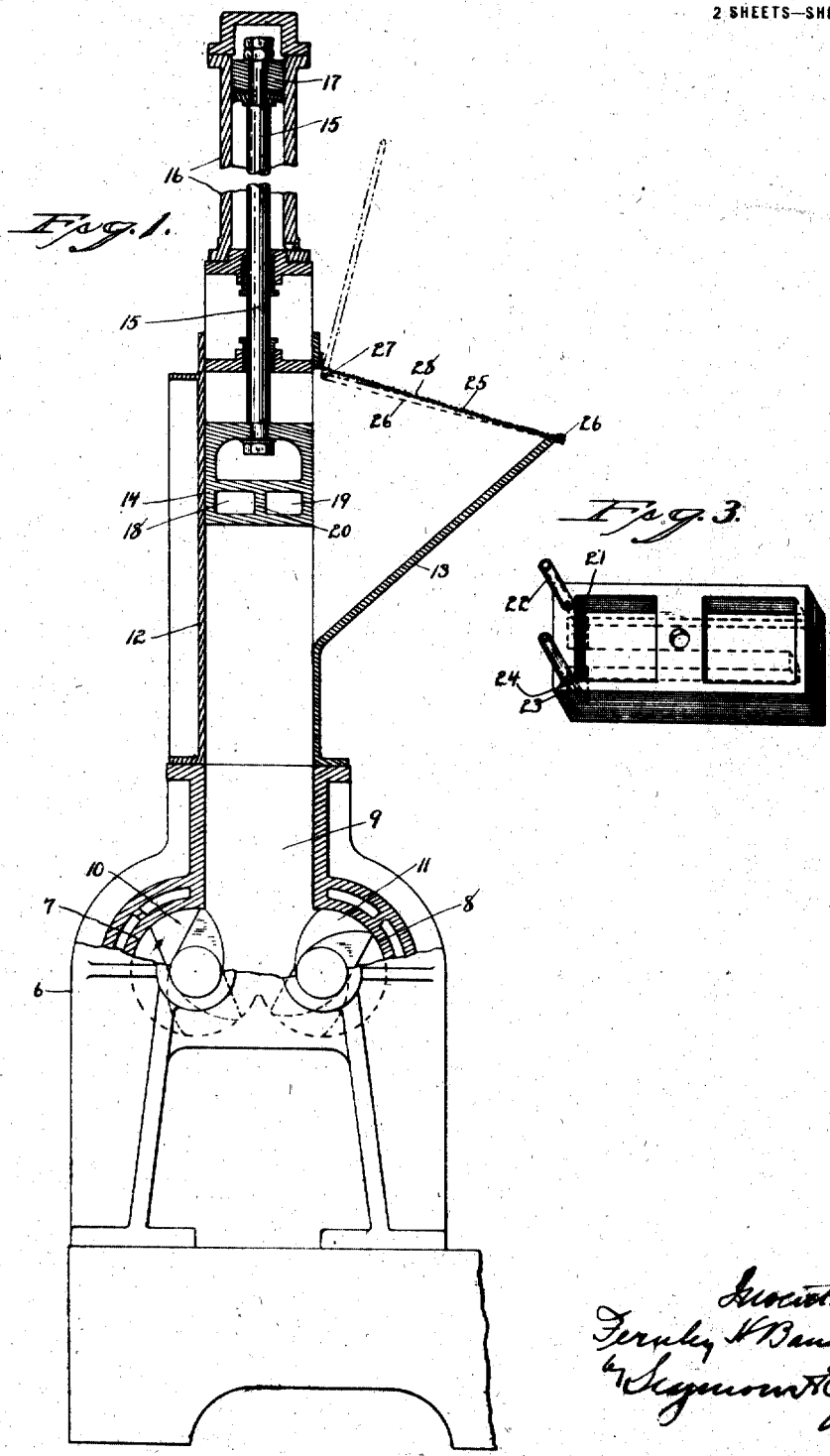

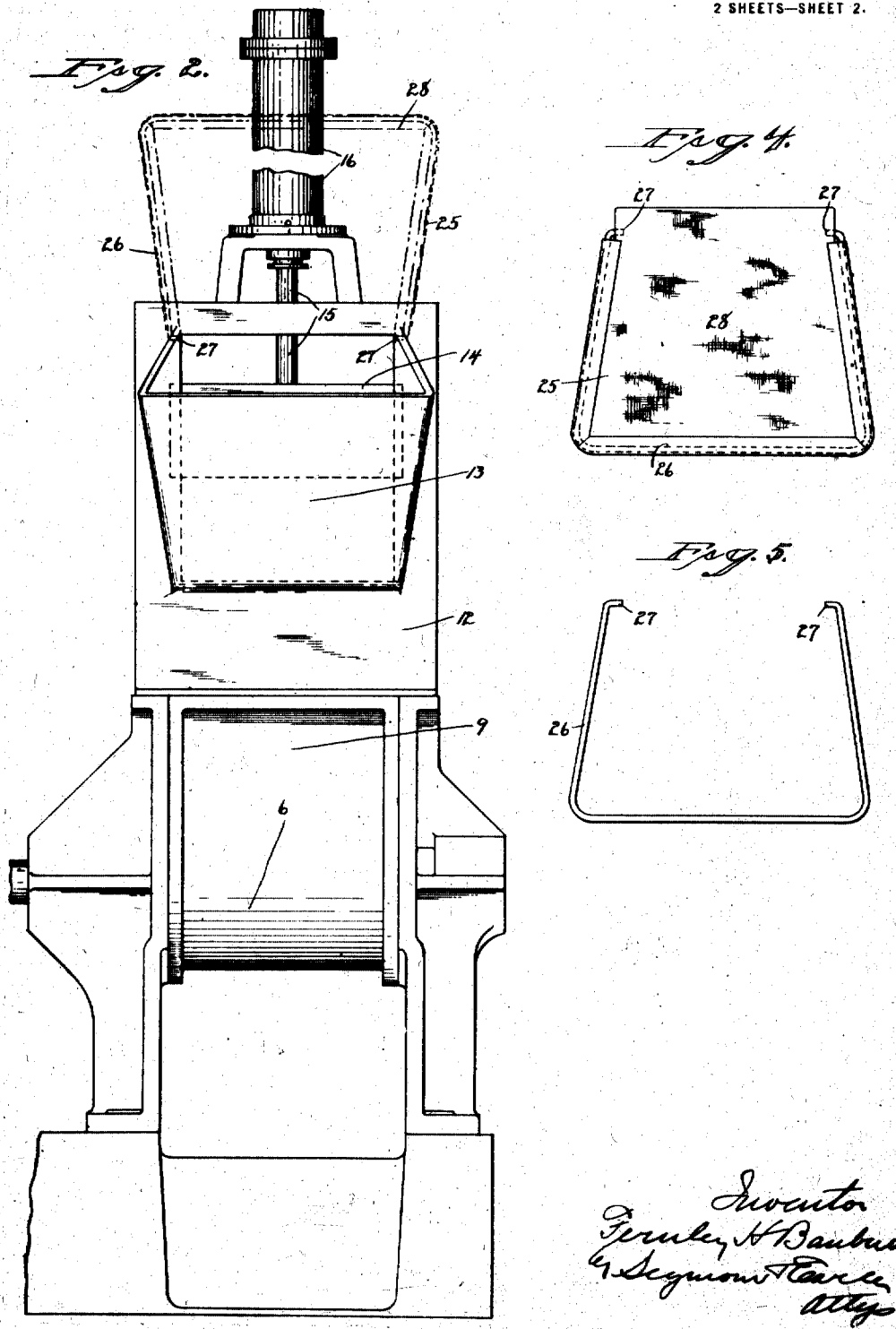

UNITED STATES PATENT OFFICE.

FERNLEY H. BANBURY, OF ANSONIA, CONNECTICUT, ASSIGNOR TO BIRMINGHAM IRON FOUNDRY, OF DERBY, CONNECTICUT, A CORPORATION.

MACHINE FOR TREATING RUBBER AND OTHER HEAVY PLASTIC MATERIAL.

1,279,220.  Specification of Letters Patent.  Patented Sept. 17, 1918.

Application filed April 20, 1917. Serial No. 163,419.

*To all whom it may concern:*

Be it known that I, FERNLEY H. BANBURY, a subject of the King of Great Britain, residing at Ansonia, in the county of New Haven and State of Connecticut, have invented a new and useful Improvement in Machines for Treating Rubber and other Heavy Plastic Material; and I do hereby declare the following, when taken in connection with the accompanying drawings and the characters of reference marked thereon, to be a full, clear, and exact description of the same, and which said drawings constitute part of this application, and represent,—

Figure 1 an end view partly in section of a machine constructed in accordance with my invention.

Fig. 2 a side view of the same.

Fig. 3 a perspective view of the cooling-plate detached.

Fig. 4 a plan view of the hopper cover detached.

Fig. 5 a plan view of the cover frame.

This invention relates to an improvement in machine for treating rubber and other heavy plastic material, and is an improvement on the machine shown and described in United States Patent No. 1,200,070, dated October 3, 1916, and embodies features shown but not claimed in application filed November 18, 1916, Serial No. 132011.

The object of this invention is to improve means for feeding material to be treated, to provide a dust proof hopper from which the material is to be fed, to provide a water cooled feeding-plate or weight, and to so proportion the parts of the machine as to secure the most advantageous results in feeding and treating; and the invention consists in a machine having certain details of construction and combinations of parts as will be hereinafter described and particularly recited in the claims.

In carrying out my invention as in the previous case, I employ a casing 6 comprising two cylindrical chambers 7 and 8 arranged side by side with their upper parts opening into a communicating chamber 9. Within the chambers 7 and 8 are rotary blades 10 and 11 suitably mounted to be rotated in the chambers. Above the chamber 9 and mounted thereon is a frame 12 having an opening in one side communicating with a hopper 13 so that material placed in the hopper will pass through the casing 12 into the chamber 9 and thence into the chambers 7 and 8. The chamber 9 and portion of the frame below the hopper opening form a neck, and it will be noted that the cross-sectional width of the neck is no greater than the distance between the centers of the axes of the blades. It is also to be noted that the length of the neck is equal to or greater than 1¼ times the diameter of the rotary blades 10 and 11 and that the cross-sectional area of the neck is more, and at least 1¼ times the areas of the mixing chambers 7 and 8 excluding the space occupied by the blades. To force the material down, I employ a weight similar to that shown in the application above referred to, this weight 14 being secured to a piston-rod 15 which enters a cylinder 16 and has attached to it a piston head 17 which may be moved up and down by any desired force to raise or lower the weight 14. Preferably the length of the neck will be such as to permit of vertical travel of the weight to an extent equal to two or more times the diameter of the rotary blades. The length of the neck is the distance that the feeding weight can travel through the neck where it is inclosed by four sides. In this case the weight 14 is used not only as a weight, but also as a cooling-plate and is formed with two passages 18 and 19 separated by a wall 20 which is less in length than the length of the passages 18 and 19 so as to provide communication between the two passages at one end. From the passage 18 a port 21 extends upward through the top of the weight and with which a flexible pipe 22 may extend to a source of water supply, while the passage 19 has a port 23 which is coupled with a flexible pipe 24 through which water may be discharged, thus maintaining the circulation of water around the plate. In treating rubber, a powder, such as lampblack, or other material, is frequently used; and to prevent this powder from escaping, I provide a cover 25 for the hopper. This cover consists of a wire frame 26 the ends 27 of which are turned inward to engage with holes formed for it in the sides of the hopper and over this wire frame is stretched a fabric covering 28 which, while preventing the escape of dust will allow air to pass through it so as not to interfere with the feeding of material. By proportioning the neck to the size of the cylinders as above specified, I facilitate the operation of feeding and treating the material which is bulky. If the neck is short it is difficult and almost impossible to load the device so that the treating operation is effective.

I claim:—

1. In a machine of the class described, the combination with a double cylindrical chamber, of a rotary blade in each side of the chamber, and a contracted neck opening into the top of the chambers above the said blades, the length of the neck being not less than the diameter of the rotary blades.

2. In a machine of the class described, the combination with a double cylindrical chamber, of a rotary blade in each side of the chamber, and a contracted neck opening into the top of the chambers above the said blades, the length of the neck being greater than the diameter of the rotary blades.

3. In a machine of the class described, the combination with a double cylindrical chamber, of a rotary blade in each side of the chamber, and a contracted neck opening into the top of the chambers above the said blades, the length of the neck being not less than 1¼ times the diameter of the rotary blades.

4. A machine of the class described comprising a double cylindrical chamber, blades in said chamber, and a neck opening into the top of the said chamber the cubic capacity of the said neck being not less than the cubic capacity of the said chamber exclusive of the space occupied by the said blades.

5. A machine of the class described comprising a double cylindrical chamber, blades in said chamber, and a neck opening into the top of the said chamber, the cubic capacity of the said neck being greater than the cubic capacity of the said chamber exclusive of the space occupied by the said blades.

6. A machine of the class described comprising a double cylindrical chamber, blades in said chamber, and a neck opening into the top of the said chamber, the cubic capacity of the said neck being not less than 1¼ times the cubic capacity of the said chamber exclusive of the space occupied by the said blades.

7. In a machine of the class described, the combination with a double cylindrical chamber and neck, of a weight movable in said neck, said weight formed with a cooling passage, and means for raising and lowering the said weight.

8. In a machine of the class described, the combination with a double cylindrical chamber and neck, of a weight movable in said neck, said weight formed with a cooling passage, flexible pipes connecting with said passage, and means for raising and lowering the said weight.

9. In a machine of the class described, the combination with a double cylindrical chamber, of a neck opening into the top of the said chamber, a hopper opening into said neck, and a feeding weight movable in said neck and adapted to force material delivered from the hopper into said chamber and the length of the neck being greater than the diameter of the blades.

10. A machine of the class described comprising a double cylindrical chamber and a neck having straight sides, a blade mounted in each side of the chamber the cross-sectional width of the neck being less than the horizontal distance between the centers of the axes of the said blades and the length of the neck being greater than the diameter of the blades.

11. A machine of the class described comprising a double cylindrical chamber and a neck, a blade mounted in each side of the chamber the cross-sectional width of the neck being less than the horizontal distance between the centers of the axes of the said blades, and a weight movable in said neck.

12. In a machine of the class described, the combination with a double cylindrical chamber, of a neck opening into the top of said chamber, a hopper opening into said neck, a cover for said hopper, said cover formed from dust-proof fabric substantially as described.

In testimony whereof I have signed this specification in the presence of two subscribing witnesses.

F. H. BANBURY.

Witnesses:
 FREDERIC C. EARLE,
 MALCOLM P. NICHOLS.